No. 892,655. PATENTED JULY 7, 1908.
F. G. DURYEE.
BATTERY CHARGING APPARATUS.
APPLICATION FILED DEC. 17, 1906.

3 SHEETS—SHEET 1.

WITNESSES:
J. M. Springer
Francis M. Springer

INVENTOR
Frederick G. Duryee
BY
Thompson & Bee
ATTORNEY

No. 892,655. PATENTED JULY 7, 1908.
F. G. DURYEE.
BATTERY CHARGING APPARATUS.
APPLICATION FILED DEC. 17, 1906.
3 SHEETS—SHEET 2.
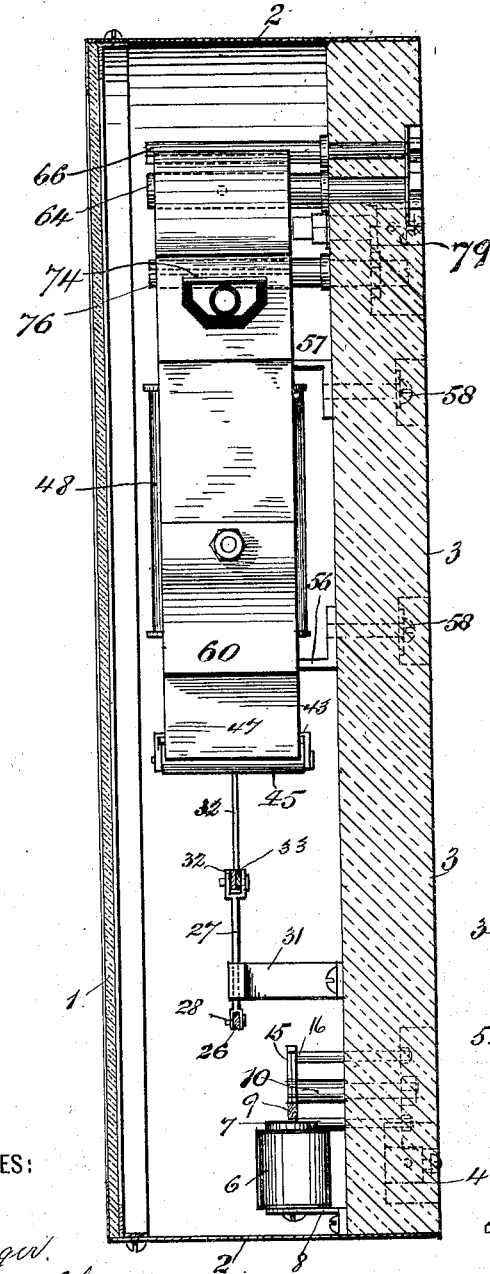
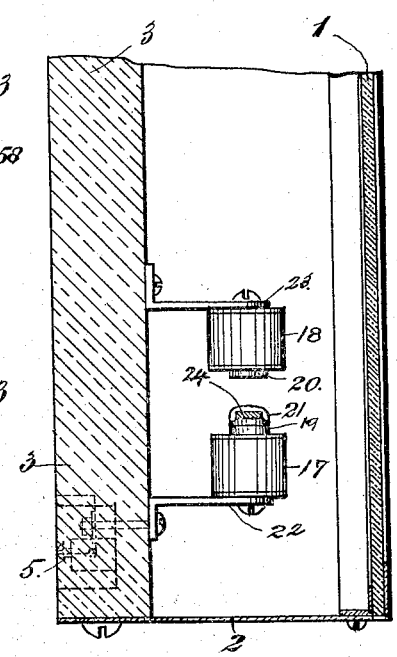
WITNESSES:
J. M. Springer.
Francis M. Springer.
INVENTOR
Frederick G. Duryee
BY
Thompson Bell
ATTORNEY No. 892,655. PATENTED JULY 7, 1908.
F. G. DURYEE.
BATTERY CHARGING APPARATUS.
APPLICATION FILED DEC. 17, 1906.

3 SHEETS—SHEET 3.

WITNESSES:
J. M. Springer
Francis M. Springer

INVENTOR
Frederick G. Duryee
BY
Thompson R Bell
ATTORNEY

UNITED STATES PATENT OFFICE.

FREDERICK G. DURYEE, OF FORT WAYNE, INDIANA.

BATTERY-CHARGING APPARATUS.

No. 892,655.  Specification of Letters Patent.  Patented July 7, 1908.

Application filed December 17, 1906. Serial No. 348,203.

*To all whom it may concern:*

Be it known that I, FREDERICK G. DURYEE, citizen of the United States, residing at Fort Wayne, in the county of Allen and State of Indiana, have invented certain new and useful Improvements in Battery-Charging Apparatus, of which the following is a specification, reference being had therein to the accompanying drawing.

This invention relates to an improved apparatus for automatically regulating the flow of an electric fluid from the source of supply into a storage-battery, as will be hereinafter more fully set forth and particularly pointed out in the claims.

The object of this invention is, first; to provide means whereby to regulate the flow of the electric fluid from a generator or other source of power into a battery to be stored for use, second; to provide a means whereby the polarity of the feed-wires connected to the storage-battery to which this apparatus is connected will be maintained continuously without a change of the polarity of the feed-wires connected to the storage-battery, or to maintain the flow of the electric fluid to the storage-battery in the proper direction, that is to say, to maintain a continuous flow of the positive electric fluid at the positive pole of the battery, and negative electric fluid to the negative pole of the battery, and to maintain this condition irrespective of a change or variation of the polarity of the feed wires of the generator or source of power to which the apparatus is connected, and third; to provide an automatically operating means whereby the flow of the current from the generator or source of supply is completely cut off when the storage battery or batteries to which the apparatus has been connected is charged to its or their fixed or rated capacity. I attain these objects by means of the apparatus illustrated in the accompanying drawings in which similar numerals of reference designate like parts throughout the several views.

Figure 1:
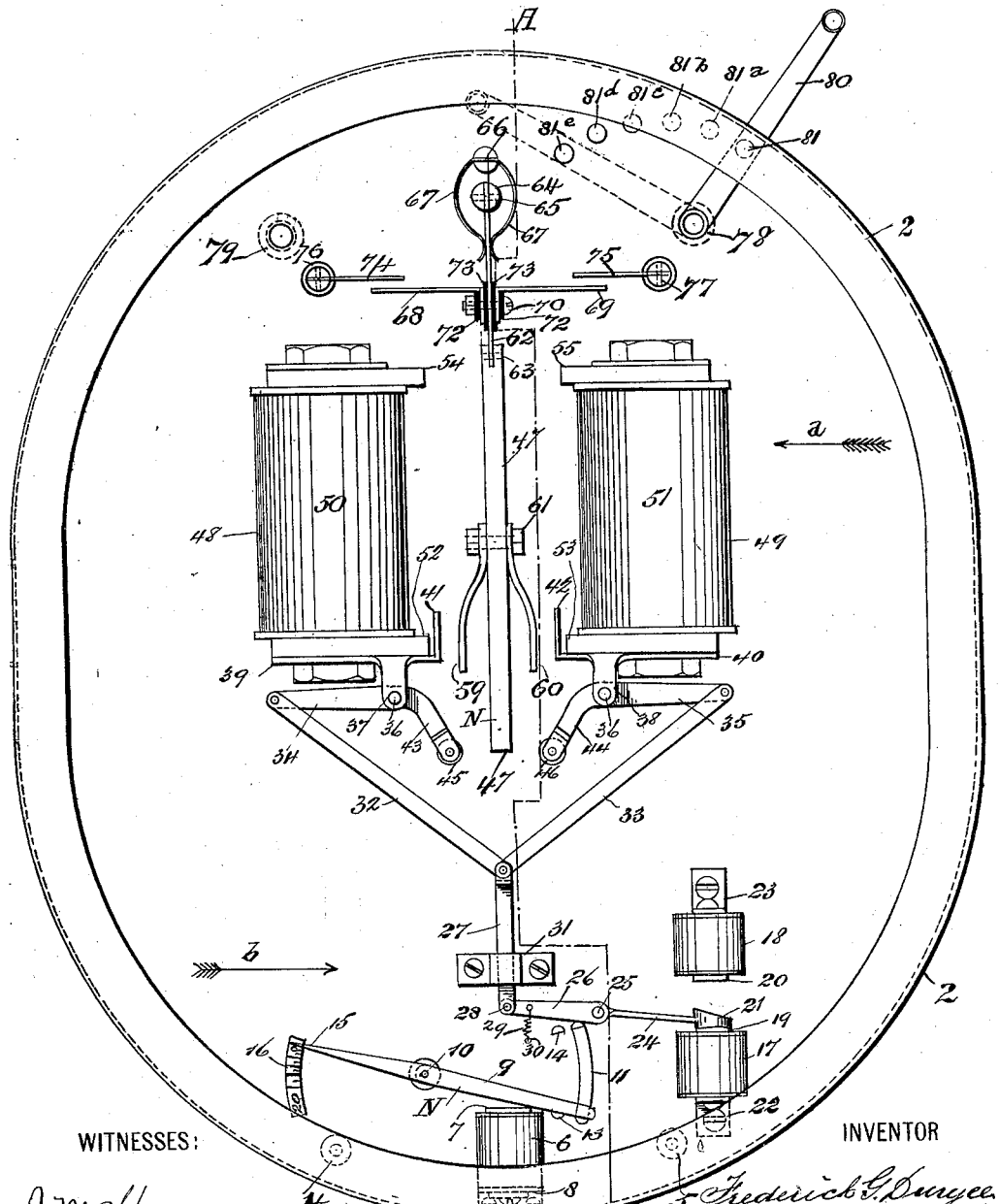

Figure 1. is a front or face view of the apparatus; Fig. 2. is a longitudinal sectional view of the same taken through the line A—B see Fig. 1. and looking in the direction of the arrow *a;* Fig. 3. is a similar broken sectional view of the bottom of the apparatus taken through the line A—B see Fig. 1 and looking in the direction of the arrow *b;* and, Fig. 4. is a diagrammatic view of the apparatus showing the wiring of the same.

Referring to the drawings the apparatus is preferably inclosed in a protecting casing of which 1 is the transparent face, preferably of strong glass, 2 the casing and 3 the back or base of hard rubber, fiber material, slate or any suitable insulating or non-conducting material.

The post 5 of the apparatus may be designated the positive pole post, and the post 4 the negative pole post and to these are connected the positive and negative pole wires of the generator or other source of supply of the electric fluid.

The volt-meter coil 6 having the core 7, is supported in its proper position by its supporting bracket 8 which latter is secured to the back or base board 3.

The armature or deflector arm 9 is polarized being permanently north pole at its swinging end, and said deflecting arm or armature is pivotally mounted on the end of its supporting-post 10 and has its swinging end adapted to rest on and contact with the contact 11 which latter is curved to correspond with a radius equal to the distance of the contact end of the deflecting arm 9 from its pivotal center, and said contact is securely maintained in its proper position by its supporting-posts 12 which latter are secured to the base or back 3.

The terminal contacts 13 and 14 project from said base 3, adjacent to the circular contact 11 and are situated at the termini of the swing of the deflecting arm or armature 9. On the opposite side of the pivotal point of the said deflector arm 9 is an indicating needle or pointer 15 which indicates the voltage of the fluid with which the battery is charged on the indicator face 16.

The oppositely situated coils 17 and 18 are provided with the soft iron cores 19 and 20 between which is situated the armature 21 of soft iron. The coils 17 and 18 together with their cores are supported in their opposing positions by their supporting-brackets 22 and 23 to which the coils are secured.

The armature 21, which is of either soft iron or soft steel, is formed on the end of the pivotal arm 24 which latter is pivotally mounted on the end of the supporting post 25 secured on the base-board 3, and said arm 24 is prolonged beyond its pivotal point to form the lever-arm 26, the swinging end of which is connected to the bottom end of the sliding-bar 27 by a connecting pin 28. A spring 29 is connected at one of its ends to the lever arm 26 at a point intermediate its end and its pivotal point, and at its other end to the retaining pin 30 secured to the base 3, and the said spring is provided for the purpose of operating as a counterbalance-spring to assist the operation of the throw out arms 43 and 44 to throw out the armature 47 when the current is being automatically cut out. See Figs. 1. and 4.

The sliding-bar 27 is of non-magnetic material and is supported and guided to move in a direct straight line by the guiding support 31 secured to and projecting from the surface of the base 3. To the top end of the sliding bar 27 is connected the connecting rods 32 and 33 which rods are connected at their top ends to the outer ends of the lever arms 34 and 35. The arms 34 and 35 are also of nonmagnetic and non-conducting material and pivoted on the pins 36 carried by the lugs 37 and 38 formed on the arms 39 and 40 of the lower right and left hand contacts 42 and 41 which are insulated from the lugs 37 and 38. The arms 34 and 35 are prolonged beyond their pivotal points to form the roller-carrying crank-arms 43 and 44 on the ends of which are pivotally mounted the throw-out rollers 45 and 46 which are preferably constructed of an insulating material, as rubber, fiber or other suitable insulating material. The roller-carrying crank-arms 43 and 44 are of such a length and are cranked to such an extent as to permit the rollers 45 and 46 to be swung into and out of contact with the polarized armature 47, situated equally distant between said rollers and the main coils 48 and 49 surrounding the cores 50 and 51 to the top and bottom ends of which cores are secured the pole ends 52, 53, 54, and 55 which are of soft iron or soft steel. The cores 50 and 51 and their poles 52, 53, 54, and 55 are supported and maintained in position by their supporting legs 56 and 57 the bearing feet of which are secured to the base 3 by the securing screws 58. The armature 47 is permanently polarized, its north pole being situated at its bottom end or that end situated between the throw out rollers 45 and 46. Secured to said armature 47 on the opposite sides thereof to be situated to confront the lower fixed contacts 41 and 42, are the armature contacts 59 and 60 which are secured to said armature by a securing screw 61, and said contacts are adapted to be moved toward either the left hand or the right hand side toward either of the contacts 41 and 42 according as the armature 47 is attracted to swing toward the left hand or the right hand fixed contact, as will be hereinafter more fully set forth. The armature 47 is slit at its top end or south pole end to receive the lower end of the resilient armature supporting spring 62 in which slit the latter is secured by a securing-pin 63. The opposite top end of the said armature supporting spring 62 is adapted to fit into a slit formed in the supporting post 64 secured to and extending from the face of the base board 3, and the said armature supporting spring is secured in the slit of said post by a securing pin 65.

A spring-carrying post 66 is situated directly above the post 64, and the same is slit to receive the centering-spring 67 which latter has its arms adapted to extend downwardly over the sides of the armature spring 62, and has its ends adapted to bear against the opposing sides of said armature supporting-spring for the purpose of yieldingly retaining said armature 47 in its normal or central position between the coils 48 and 49 when the current is cut off from the apparatus. At a point intermediate the ends of the armature supporting-spring 62 and situated on the diametrically opposite sides thereof are the left hand and the right hand upper tilting contacts 68 and 69 which are secured permanently thereto by a suitable securing bolt 70. The feet of the contacts 68 and 69, the armature supporting spring and the securing bolt 70 are insulated from each other by means of the washers 72 and the liners 73, both of which are of rubber, fiber or other suitable insulating or non-conducting material.

The left hand and the right hand upper contacts 74 and 75 are secured to their supporting posts 76 and 77 which latter are connected to the binding post 79 situated on the outer side of the base 3 so as to be easy of access to connect a suitable conducting wire thereto. The fixed upper contacts 74 and 75 are so situated relatively to the upper swinging or tilting contacts 68 and 69 that either pair will contact simultaneously that is to say, the pair situated on either side of the armature will contact simultaneously.

A rheostat comprising the lever 80 is pivotally mounted on the post 78 and is adapted to bear on the contacts 81, 81$^a$, 81$^b$, 81$^c$, 81$^d$, 81$^e$, which contacts are connected to resistance coils hereinafter referred to.

Figure 4:
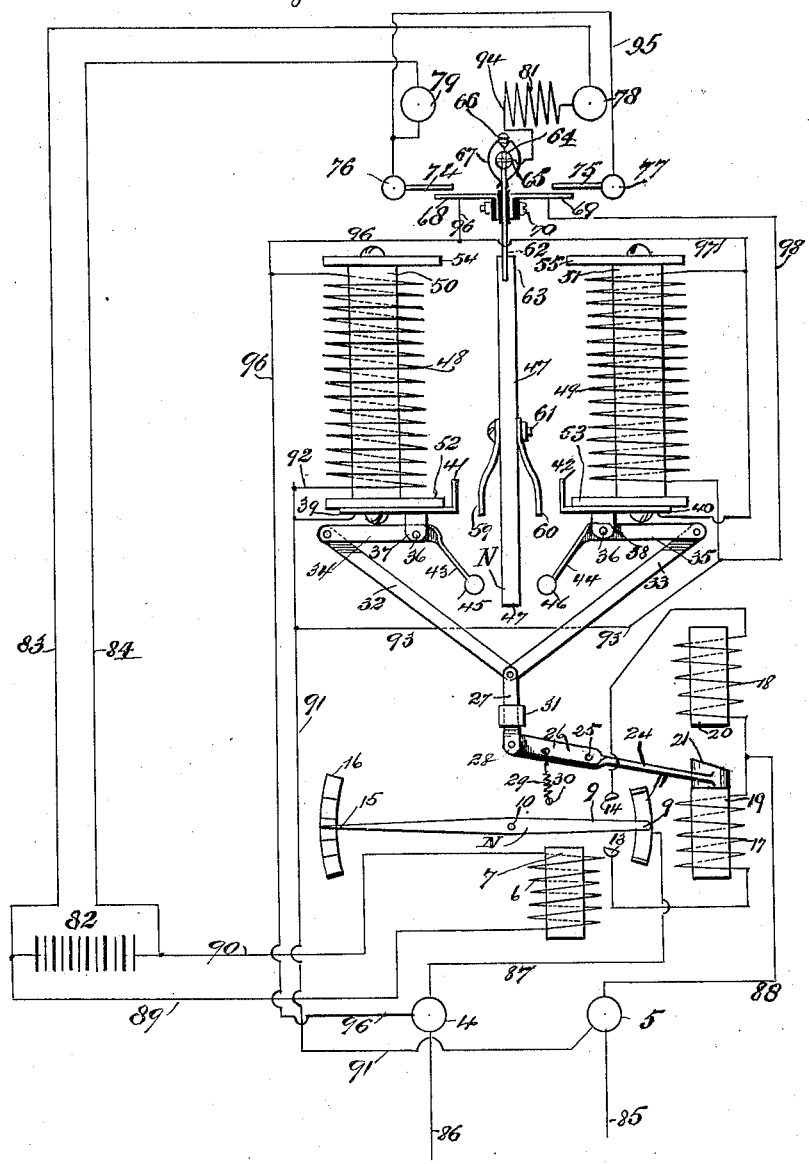

Referring particularly to Fig. 4. I will proceed to describe the manner of wiring the several parts of the apparatus.

Suppose the storage battery 82 to be any suitable storage battery and required to be charged, the positive and negative poles of which are connected to the posts 78 and 79 by the conducting wires 83 and 84. The feed wires extending from the generator or source of supply are connected to the posts 4 and 5 of the apparatus, the positive wire 85 to the post 5 and the negative wire 86 to the negative post 4 while the apparatus is in use or is connected to a storage battery, as the storage battery 82. Shunt wires 87 and 88 extend from the binding posts 4 and 5, the wire 87 to connect the post 4 with the contact 11 and the wire 88 to connect the post 5 to the coils 17 and 18 surrounding the cores 19 and 20, the other end of the coil 17 being connected to the terminal contact 13, and the end of the coil 18 to the terminal contact 14. A shunt wire 89 extends from the positive pole of the battery 82 to the bottom end of the right hand coil 6 of the core 7, and a shunt wire 90 extends from the negative pole of said battery to the top end of said right hand coil 6.

A wire 91 extends from the (for the instant) positive post 5 to connect to the lower left hand contact arm 39 of the (for the instant) positive contact 41, this contact 41 being of course of the same polarity as the post 5 to which it is connected, and a shunt wire 92 extends from said wire 91 to connect to the bottom end of the coil 48 which is a right hand coil. A branch shunt wire 93 connects the bottom end of the left hand coil 49 with the wire 91. A wire 94 extends from the post 64 to the resistance coil 81 thence to the post 78 from which latter post the wire 83 extends to the positive pole of the battery 82, as previously described.

A main conducting wire 95 connects the posts 76 and 77, and a wire 96 extends from the contact 68 to connect with the post 4. A shunt is formed by connecting the top end of the coil 48 to the wire 96. A shunt wire 97 extends from the wire 96 to connect to the top of the coil 49 which is left hand wound, and thence extends to connect to the arm 40 of the right hand contact 42. A wire 98 extends from the right hand upper contact 69 to connect to the wire 93 previously described.

The operation of this invention is as follows:—The end of the wire 85, connected to the positive pole of the generator or source of supply, is connected to the positive post 5 of the apparatus, and the wire 86, connected to the generator or source of supply, is connected to the post 4. A positive electric current passes from the post 5 along the wire 91 to the foot or arm 39 of the contact 41, and a portion of this current is shunted to the bottom end of the right-hand-wound-coil 48, thereby making the magnet 52 south pole to attract the armature 47 which is permanently north pole at its bottom or depending end to cause the contact 59 to approach and contact the left hand bottom contact 41. This current at the same time shunts through the shunt wire 93 leading to the bottom end of the coil 49 making the magnet 53 north pole to repel the armature 47 to assist the contact of the contact 59 to the contact 41 whereby a circuit is made through the armature 47 thence through the armature spring 62 to the post 64, thence through the resistance coil 81 to the post 78, thence through the wire 83 to the positive pole of the battery 82 which is being charged, then through the battery to the wire 84 thence to the binding post 79, thence through the wire 95 to the post 76, through the contacts 74 and 68 to and through the wire 96 to the post 4 to complete the circuit.

If the current from the generator to the posts 4 and 5 should by any means or cause whatever reverse, that is to say, the post 4 were to change to positive pole and the post 5 to a negative pole, the operation would be as follows:—The positive current would then enter the binding post 4, through the wire 96 and shunt to enter the top of the coil 48 making the magnet 52 north pole to repel the polarized armature 47. The current then passes through the connecting wire 97 and shunts to enter the top end of the coil 49 making the magnet 53 south pole to attract the armature 47 to cause the lower contact 60 to approach to contact with the contact 42 simultaneously with the confacting of the upper contacts 69 and 75, thereby making electric connection and contact between the contact 42 and the contact 60, thence through the armature 47 and its spring support 62 to the post 64. The current then passes through the wire 94 to and through the resistance coil 81 to the binding post 78 thence through the wire 83 to the battery 82, through the battery 82 to and through the wire 84 to the post 79, thence through the wire 95 to the post 77, thence to and through the contacts 75 and 69, thence through the wire 98 to and through the wire 93 to the wire 91, thence to the post 5 to the now negative pole wire 85 of the generator.

It will be seen from the foregoing that the polarity of the wires connected to the poles of the battery are maintained constantly and continuously without change, that is to say, the positive pole wire to the positive pole of the battery is always positive, and the negative pole wire to the negative pole of the battery is always maintained negative.

This apparatus operates automatically as a switch under such conditions as when the generator or source of supply of the current fails, the armature 47 will immediately assume its central or normal position, see particularly Figs. 1. and 4.; but immediately the current from the generator is renewed or becomes perceptible, the armature 47 assumes its correct position according to the polarity of the current applied to the posts 4 and 5 of the apparatus.

When the battery 82 is charged to its full capacity, usually about 25 volts when ten cells are employed, the cut-off mechanism of this apparatus will automatically operate to shut off the current from the storage battery connected to the charging apparatus.

The polarized deflector 9, when at rest, contacts the contact 11 and the contact 13, thus closing the circuit with the coil 17, and the current passing through the wire 87 to and through said coil makes the core 19 attract the soft armature 21, thereby operating the fiber throw out rollers 45 and 46 to recede from the armature 47 and release it to permit said armature to freely swing to either the right or the left toward either of the contacts 41 and 42 according as it is repelled or attracted by the magnets 52 and 53, and thus the apparatus operates to charge the storage battery 82. Immediately the apparatus begins to charge the current proceeds from the storage battery to the coil 6 to make the magnet 7 north pole to repel the armature 9, which is polarized and north pole, to repel the same to move it gradually toward the contact 14 as the strength, pressure or voltage of the current flowing from said battery 82 increases, and when the said armature 9 has reached said terminal contact 14, the battery 82 has received its complete charge of electric fluid, at which time the polarized armature 9 connects the terminal contact 14 with the contact 11 to connect with the coil 18 to cause the core 20 to attract the armature 21 to cause the insulated throw out rollers 45 and 46 to approach each other, by connecting mechanism previously described, to move the armature 47 to its central position thereby moving the lower contacts 59 and 60 out of contact with their contacts 41 and 42, and simultaneously moving the contacts 68 and 69 out of contact with the contacts 74 and 75, and thus a further supply of electric fluid, over and above the required and fixed charge is prevented.

I claim:—

1. In an electric battery charging apparatus, the combination with a source of electric supply, a storage battery and a conducting means connecting said source of supply and said storage battery to form a main circuit and a shunt circuit, of a pair of electric magnets included in said shunt circuit, a polarized armature situated between said magnets, said armature included in said main circuit, terminals connected to the source of electric supply and carried by said magnets to project toward said polarized armature to intercept the same, insulated projecting contact arms connected to and situated on the opposing sides of said polarized armature near the pivotal point thereof, fixed terminal contacts situated on opposite sides of said armature to be alternately contacted by said arms to rectify the current flowing to said battery.

2. In an electric battery charging apparatus, the combination with a source of electric supply, a storage battery and a conducting means between said source of supply and said storage battery, and a shunt circuit, of a pair of electric magnets included in said shunt circuit, a polarized armature situated between said magnets and included in said main circuit, an armature supporting means, lower contacts situated on the opposite sides of said armature, contact terminals situated opposite and adjacent to said lower contacts on said armature, outwardly extending insulated contact arms connected to and situated on the opposite sides of said armature near the supporting means thereof, fixed contact terminals connected to said conducting means connected to said storage battery and situated in the swinging path of said armature contact arms to be contacted by the latter to rectify the current flowing to said battery.

3. In an electric battery charging apparatus, the combination with an electric circuit and a vibratory pole changer included in said circuit, of a pair of insulated pivotal throw out lever arms situated on opposite sides of said vibratory pole changer, a pair of opposing magnets, a shunt circuit in which the opposing magnets are included, an armature pivotally mounted and situated to swing between said opposing magnets, connecting rods connected to said throwout lever arms to simultaneously operate the same, and to said armature, and a controlling means whereby, when the storage battery to be charged has received its charge, the shunt current operates to move said armature to cause said throw out lever arms to approach said pole changer to move the same to open or cut out the main circuit.

4. In an electric battery charging apparatus, the combination with an electric circuit and a throw out lever, of a pair of insulated pivotal throw-out arms situated on the opposite sides of said throw out lever, a shunt circuit, a pair of auxiliary opposing magnets included in said shunt circuit, an armature carrying lever arm, an armature situated between said opposing auxiliary magnets and carried by said armature carrying arm, rods connected to said throw out lever arms and to the end of one arm of said armature-carrying lever-arm whereby said throw out lever arms are simultaneously operated, a battery pressure indicating means and a switching means connected thereto whereby the flow of the current to the shunt is controlled.

5. In an electric battery charging apparatus, the combination with an electric circuit and a throw-out lever in said circuit, of a pair of insulated throw-out arms situated on opposite sides of said throw-out, a shunt circuit, a pair of opposing auxiliary magnets included in said shunt circuit, an armature carrying lever arm, an armature situated between said auxiliary magnets and carried by said arm, rods connected to said throw-out lever arms and to one end of said armature carrying lever arm to simultaneously operate said throw-out levers, a battery pressure indicating means and a switching means connected thereto whereby the said armature of said auxiliary magnets and the throw out levers are simultaneously operated to throw out the main pole-changer when the battery is charged to its full capacity.

In testimony whereof I affix my signature in presence of two witnesses.

FREDERICK G. DURYEE.

Witnesses:
N. H. CRAWFORD.
F. H. KLEEKAMP.